United States Patent [19]

Robbins, III

[11] Patent Number: 5,213,741
[45] Date of Patent: May 25, 1993

[54] METHODS FOR FORMING PLASTIC PRODUCTS HAVING BEVELED PERIPHERAL EDGES OF SUBSTANTIALLY CONSTANT GEOMETRY

[76] Inventor: Edward S. Robbins, III, 459 N. Court St., Florence, Ala. 35630

[21] Appl. No.: 725,837

[22] Filed: Jul. 3, 1991

Related U.S. Application Data

[60] Division of Ser. No. 517,197, May 1, 1990, Pat. No. 5,048,182, which is a division of Ser. No. 250,684, Sep. 29, 1988, Pat. No. 4,938,677, which is a continuation-in-part of Ser. No. 17,603, Feb. 24, 1987, abandoned, and a continuation-in-part of Ser. No. 158,622, Feb. 22, 1988, abandoned.

[51] Int. Cl.$^5$ .................. B29C 69/02; A01B 29/00
[52] U.S. Cl. .................. 264/151; 29/895.21; 264/175; 264/210.1
[58] Field of Search .............. 29/121.1, 121.2, 121.5, 29/121.6, 895.21; 264/151, 153, 160, 175, 210.1, 212, 177.16; 425/142, 150, 295, 297, 302.1, 304, 328, 362, 366

[56] References Cited

U.S. PATENT DOCUMENTS

| | | | |
|---|---|---|---|
| 154,396 | 8/1874 | James ................... | 29/121.1 |
| 1,797,568 | 3/1931 | Dean ................... | 264/175 |
| 1,802,003 | 4/1931 | Connelly ............... | 29/121.1 |
| 2,230,128 | 1/1941 | Blair et al. ........... | 264/175 |
| 2,482,823 | 9/1949 | Adams ................. | 425/463 |
| 2,486,258 | 10/1949 | Chavannes ............ | 264/175 |
| 2,566,628 | 9/1951 | Patt ................... | 425/363 |
| 2,752,632 | 7/1956 | Winstead .............. | 425/363 |
| 2,984,161 | 5/1961 | Cook et al. ............ | 264/175 |
| 3,182,530 | 5/1965 | Scott et al. ........... | 76/107.8 |
| 3,205,732 | 9/1965 | Hutcheon et al. ...... | 76/107.8 |
| 3,360,846 | 1/1968 | Schellstede et al. ..... | 29/447 |
| 3,508,458 | 4/1970 | Cunningham .......... | 83/864 |
| 3,526,163 | 9/1970 | Lowery ................ | 83/27 |
| 3,741,851 | 6/1973 | Erb et al. . | |
| 3,812,561 | 5/1974 | Lundgren ............. | 29/121.2 |
| 3,941,038 | 3/1976 | Bishop ................ | 76/107.8 |
| 3,994,652 | 11/1976 | Kuzyk ................ | 425/374 |
| 4,226,143 | 10/1980 | Whitecotton et al. ... | 76/107.8 |
| 4,323,533 | 4/1982 | Bramhall ............. | 264/160 |
| 4,340,557 | 7/1982 | Gross ................. | 264/151 |
| 4,381,906 | 5/1983 | Mancini ............... | 425/363 |
| 4,803,032 | 2/1989 | Schulz ................ | 264/284 |

FOREIGN PATENT DOCUMENTS 2237475 2/1974 Fed. Rep. of Germany .

Primary Examiner—Jill L. Heitbrink
Attorney, Agent, or Firm—Nixon & Vanderhye

[57] ABSTRACT

A pattern roll especially adapted to form, in an in-line manner, peripheral edges of an article having substantially constant geometry and the pattern roll's method of fabrication are described. A bounded surface region is defined on at least a portion of a pattern roll's cylindrical surface by means of a number of circumferential and longitudinal (relative to the pattern roll's central axis) segments. Beveled surfaces are formed on these rib segments with the angle formed by the beveled surface of the circumferential segment being less that the angle formed by the beveled surface of the longitudinal segment. Notwithstanding this angular difference as between the beveled surfaces of the circumferential and longitudinal rib segments, when the pattern roll is then rotated in opposition to a platen roll so as to define a nip therebetween, and a molten thermoplastic is extruded into the defined nip, a plastic product having a peripheral beveled edge of substantially constant geometry will be formed.

7 Claims, 6 Drawing Sheets

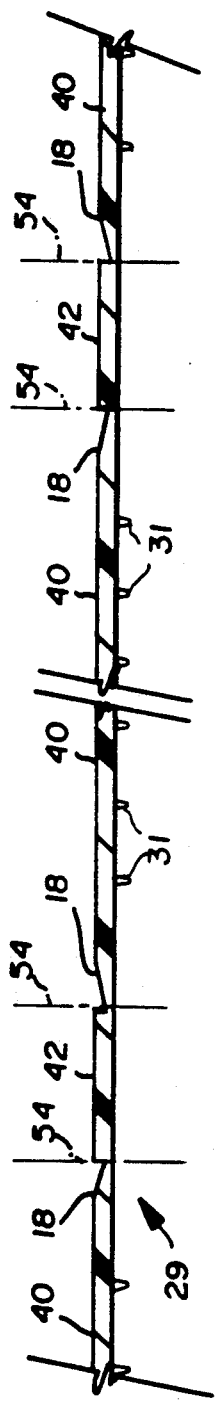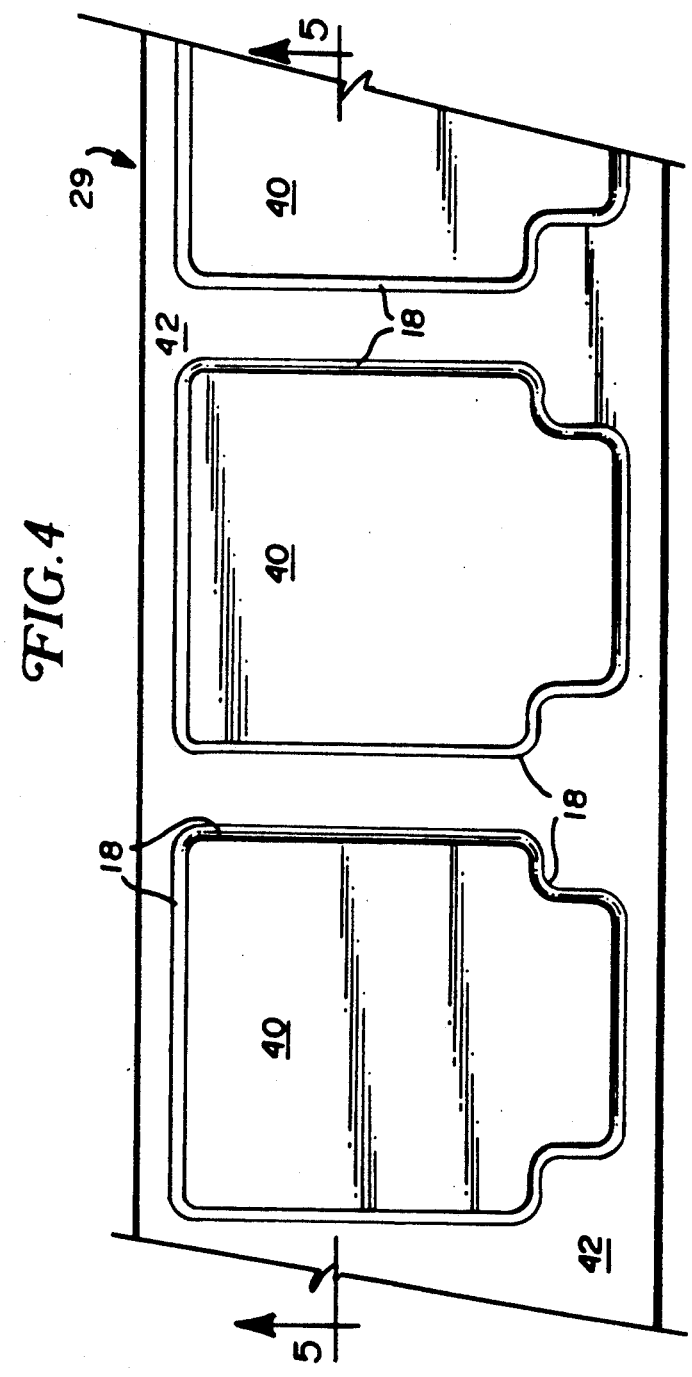

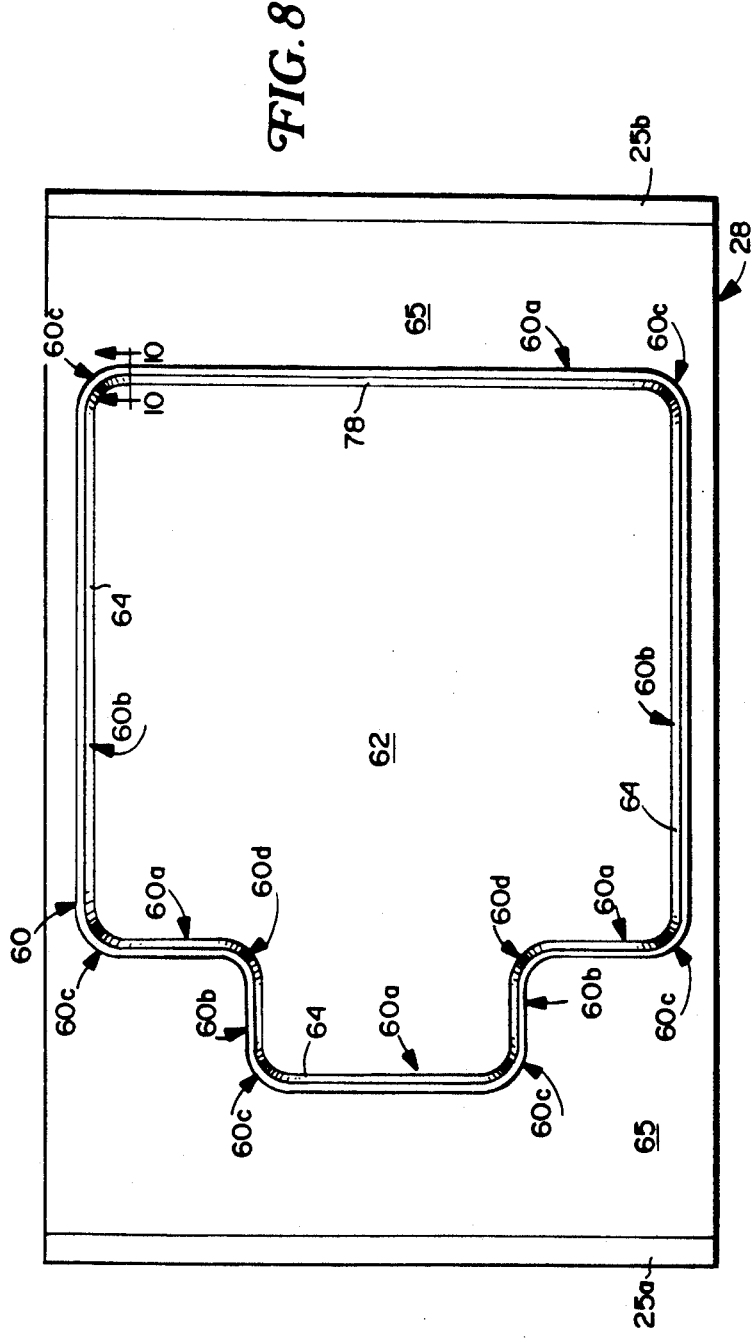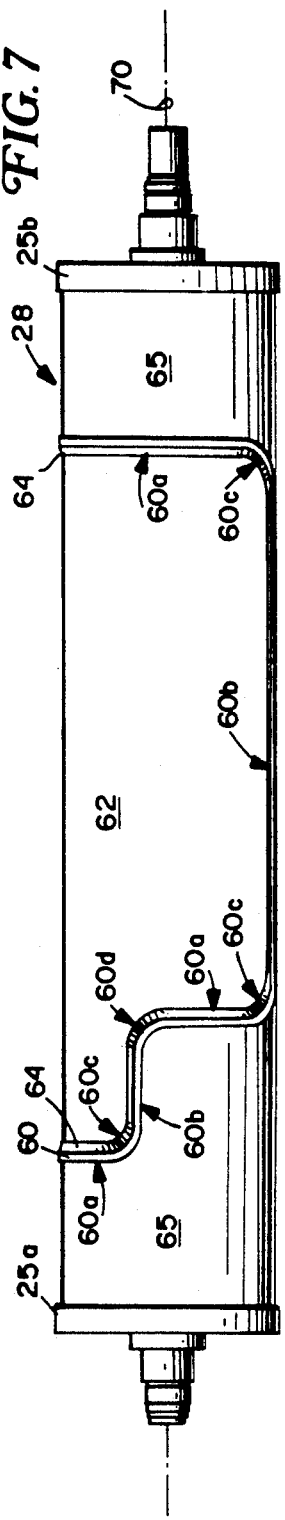

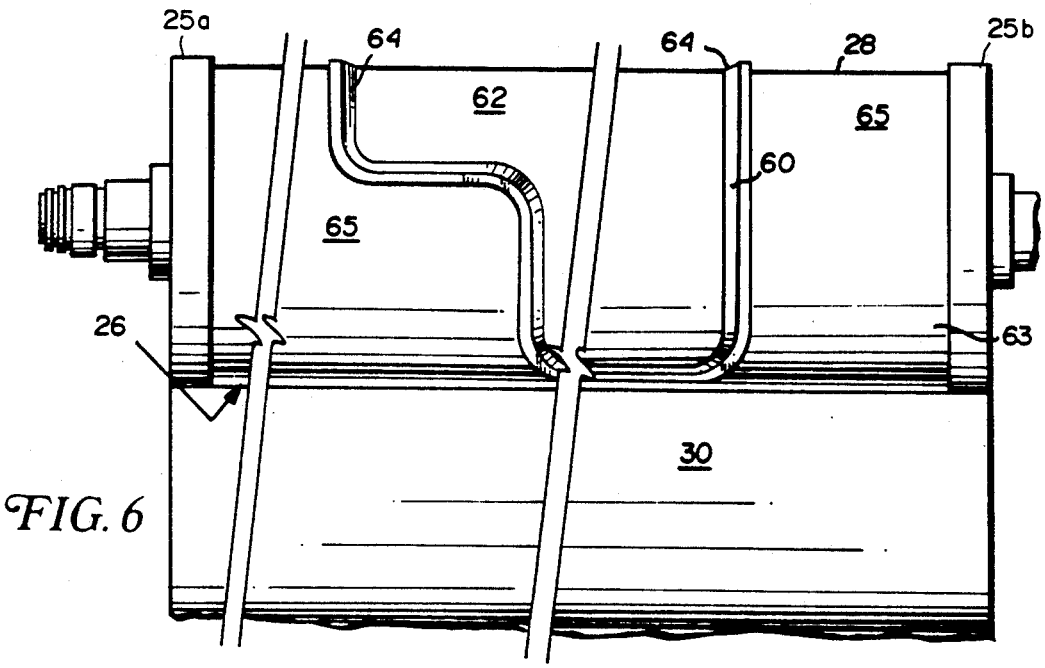
FIG. 6
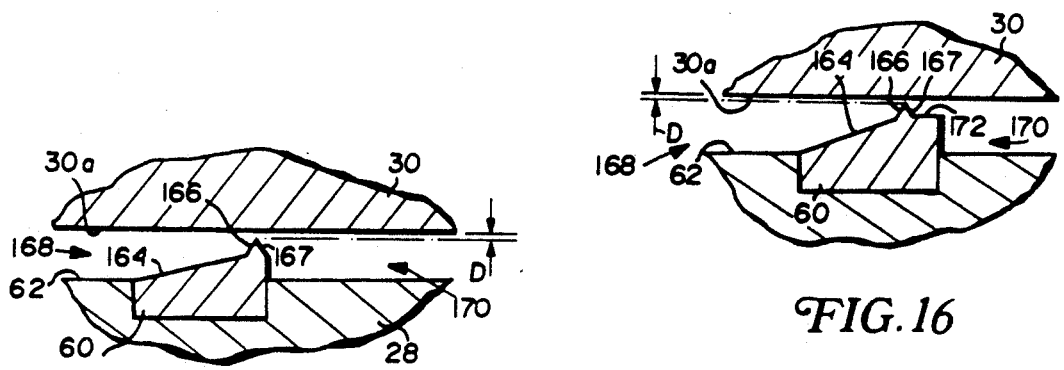
FIG. 15
FIG. 16

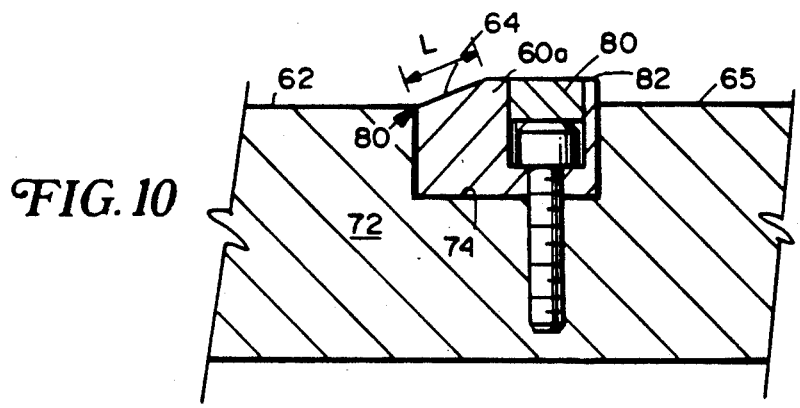
FIG. 10
FIG. 11
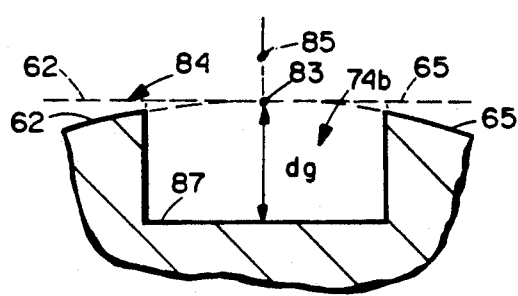
FIG. 12
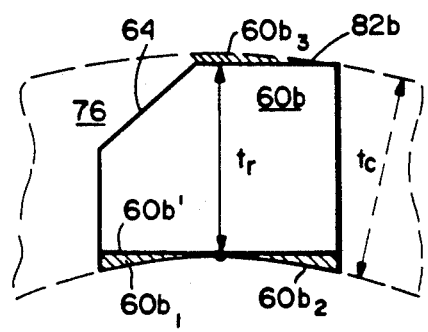
FIG. 13
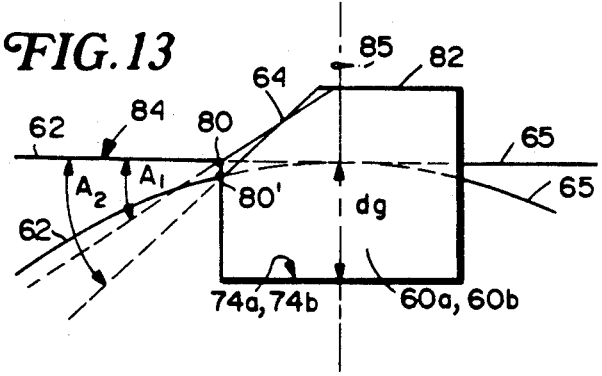
FIG. 14
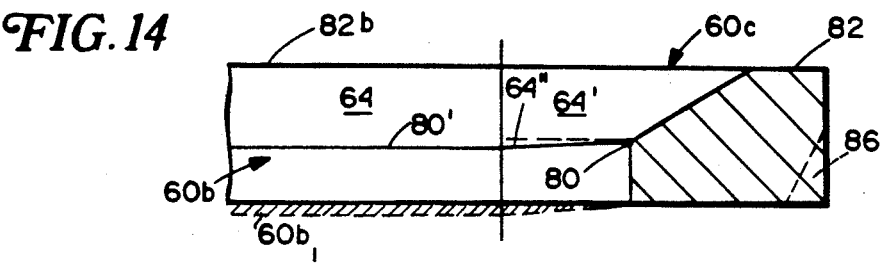

METHODS FOR FORMING PLASTIC PRODUCTS HAVING BEVELED PERIPHERAL EDGES OF SUBSTANTIALLY CONSTANT GEOMETRY

CROSS-REFERENCE TO RELATED APPLICATIONS

This application is a division of application Ser. No. 517,197, now filed May 1, 1990, now U.S. Pat. No. 5,048,182 issued Sep. 17, 1991, which in turn is a division of application Ser. No. 250,684, filed Sep. 29, 1988, now U.S. Pat. No. 4,938,677 issued on Jul. 3, 1990, which in turn is a; continuation-in-part of copending and commonly owned U.S. application Ser. Nos. 07/017,603 filed on Feb. 24, 1987, entitled "Apparatus and Methods for forming a Pattern on a Roll", (now abandoned) and 07/158,622 filed on Feb. 22, 1988, entitled "Method for the Continuous In-Line Edge Molding of Extruded Plastic Products", (now abandoned) the entire content of each of these applications being expressly incorporated by reference herein.

FIELD OF THE INVENTION

This invention relates to pattern rolls especially adapted for forming, in a continuous in-line manner, beveled peripheral edges on extruded plastic products. In specific embodiments, the invention relates to pattern rolls and methods of using the same during the simultaneous extrusion and molding of beveled edges of a floor mat (e.g., mats which are sometimes referred to as "chair mats").

BACKGROUND AND SUMMARY OF THE INVENTION

In the formation of many plastic articles, plastic sheet material is usually passed between die rolls, one or both of which may have a pattern negative for producing a pattern on the final sheet plastic product. Typically however, the formation of plastic products according to these conventional processing techniques depends upon the use of previously formed sheet stock plastic material. While the use of previously formed sheet stock material is typically not objectionable when most plastic products are produced, there are some significant disadvantages when these conventional product-forming techniques are employed to produce plastic products having contoured e.g., beveled) peripheral edges.

For example, in the production of floor mats of the type which are customarily placed between a chair's legs and the floor's surface so as to protect the latter from the marring effects of the former, it is conventional to first form a sheet of plastic material and then "punch out" (i.e., stamp) individual mats from the previously formed plastic sheet. Obviously, this technique toes not lend itself to the formation of contoured or beveled peripheral edges which bound the mat. Instead, when beveled edges are desired, it is customary to employ a router or like edge-forming tools so as to, in essence, grind, cut or otherwise shape the mat's edge to the desired contoured configuration. This conventional technique, while effective to form contoured edges, sacrifices the visual appearance of the edge (not to mention its labor intensity which contributes to increased costs and/or slower production rates for such chair ma&:s). Thus, the peripheral edges of mats formed in this conventional manner usually are marred due to the abrasive effects of the mechanical router.

The problems mentioned above could be solved by batch molding individual mats using suitably configured molds—i.e., molds which have the desired contoured edges of the resulting mat product. However, it is well recognized that batch molding of chair mats is a cost-prohibitive solution and thus, is not viable to mass produce chair mats at reasonable production costs.

It would therefore be desirable if contoured edges could be "molded" in a continuous in-line manner so as to enhance the visual appearance of the edges. It would also be very desirable from a production economic point of view if such in-line molding could be accomplished simultaneously with the extrusion of a thermoplastic material so as to produce, in a unified step, both the mat (or at least a preform of the mat) and the mat's contoured or beveled edges. The methods according to this invention achieve these desired results.

According to this invention, a plastic product (for example, a chair mat) having continuous contoured (e.g beveled) peripheral edges may be formed by using a novel pattern roll. An interior region of a cylindrical surface portion on the pattern roll is bounded by means of a continuous "rib" which corresponds to the outline of the mat and also has surfaces corresponding to the desired contoured or beveled edge of the mat.

A nip is formed between the pattern roll and a platen roll. Upon relative rotation of the pattern roll in opposition to the platen roll, discrete volumetric portions of the bounded interior region will sequentially continuously be presented to the defined nip. Simultaneously with the rotation of the pattern roll, a molten thermoplastic material is extruded into the volumetric portions of the bounded interior region which are sequentially continuously being presented at the nip. This extrusion/rotation thus causes the molten thermoplastic material to fill the presented volumetric portions of the bounded region. As may be appreciated, when this technique is practiced on a continuous, in-line manner, the bounded region will eventually form an outline of the plastic product and will, moreover cause the thermoplastic to be flowably compressed in the defined nip. This compression, in turn, allows the contoured edges to, in effect, be molded for each sequential volumetric presentation of the bounded region. In other words, the method of the present invention employs thermoplastic extrusion techniques in combination with an in-line molding technique so as to form a plastic mat, for example having the contoured edges.

A plastic product (e.g., a chair mat) is thereby produced with contoured or beveled edges without the need to first form a sheet of plastic stock and then subject the stock to after-treatments such as, cutting, edge forming and the like. That is, the method of the present invention produces contoured or beveled edges on a plastic product simultaneously with the formation cf the product itself (or at least simultaneously with the formation of a product preform).

The novel pattern roll which may be employed in the product-forming method described briefly above is fabricated from a cylindrical base roll and a cylindrical sleeve. Specifically, a recessed groove having at least some circumferentially and longitudinally (i.e., relative to the base roll's axis) extending groove sections is formed in the base roll. Corresponding circumferential and longitudinal rib segments are formed from the sleeve by removing unwanted regions thereof. Beveled surfaces providing a negative image of the beveled edge on the article to be produced are then formed on these circumferential and longitudinal rib segments.

Important to the present invention is that the beveled surfaces on the circumferential rib segments are formed at an angle $A_1$ less than an angle $A_2$ of the beveled surfaces formed on the longitudinal rib segments. Notwithstanding this angular difference, a plastic product having a peripheral beveled edge of substantially constant geometry may be formed.

Adjacent ones of the circumferential and longitudinal rib segments may be joined by means of a radius rib segment which also includes a beveled edge continuous with the beveled edges of the circumferential and longitudinal rib segments which it joins. However, due to the angular difference of the beveled edges formed on the circumferential and longitudinal rib segments, the beveled surface formed on the radius rib segment presents a smooth angular transition surface between the angles $A_1$ and $A_2$.

Other advantages and aspects of this invention will become more clear after careful consideration is given to the detailed description of the preferred exemplary embodiments of the invention which follow.

BRIEF DESCRIPTION OF THE DRAWINGS

Reference will hereinafter be made to the accompanying drawings wherein like reference numerals throughout the various FIGURES denote like structural elements, and wherein;

FIG. 4 is a top plan view of a web of mat preforms having contoured edges produced by the present invention;

FIG. 5 is a cross-sectional elevational view of the mat preforms shown in FIG. 4 and taken along line 5—5 therein;

FIG. 6 is a side elevational view showing the operative cooperation between the pattern roll of this invention and the platen roll;

FIG. 7 is a side elevational view of a preferred pattern roll according to this invention;

FIG. 8 is view showing the exterior of the pattern roll of FIG. 7 projected onto a planar surface for ease of discussion;

FIG. 10 is a cross-sectional elevational view of the pattern roll as taken along line 10—10 in FIG. 8;

FIG. 11 is detailed schematic cross-sectional view of a longitudinal groove segment as taken along line 11—11 in FIG. 9;

FIG. 12 is a detailed schematic cross-sectional view of a longitudinal segment of the continuous pattern rib of this invention as taken along line 12—12 in FIG. 9;

FIG. 13 is a composite schematic cross-sectional view of the longitudinal and circumferential pattern segments of this invention;

FIG. 14 is a detailed schematic cross-sectional view of the pattern rib as taken along line 14—14 in FIG. 9;

FIG. 15 is a cross-sectional view of an alternative pattern rib profile which may be employed in the pattern roll of this invention; and FIG. 16 is a cross-sectional view of another alternative pattern rib profile which may be employed in the pattern roll of this invention.

DETAILED DESCRIPTION OF THE PREFERRED EXEMPLARY EMBODIMENTS

Figure 1:
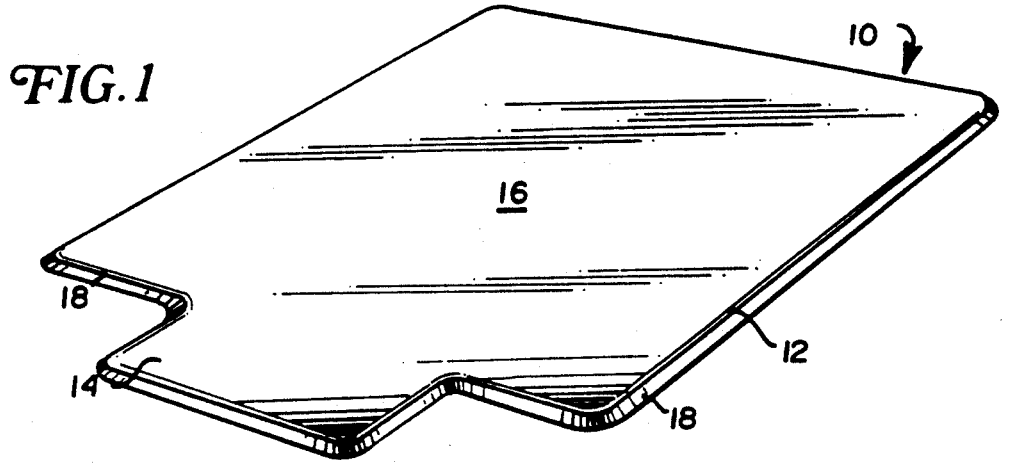
FIG. 1 is a schematic perspective view of a chair mat having contoured edges produced in accordance with the present invention.
Figure 2:
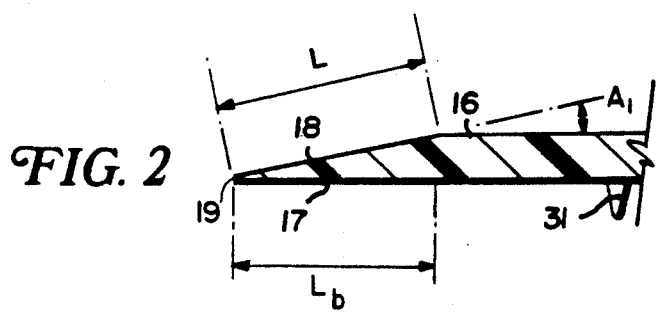
FIG. 2 is a cross-sectional profile of a preferred contoured edge which may be produced by the present invention.

FIGS. 1 and 2 illustrate a representative plastic product which may be produced in accordance with the present invention. The product illustrated in FIGS. 1 and 2 is in the form of a chair mat 10 having a base 12 and a forward extension 14 for disposition in the well of a desk whereby a chair, not shown, mounted on rollers and disposed on the upper surface 16 of mat 10 may be readily and easily moved about the mat. The peripheral edges of the mat 10 are in the form of a taper which slopes downwardly and outwardly from the top surface 16 to a marginal terminal edge 19. The tapered edge 18 is, moreover, a substantially constant length dimension L (as measured in a plane parallel to edge 18) about the entire periphery of mat 10. The taper of edges 18 is present so as to more easily facilitate smooth movement of the chair both onto and off the mat 10.

Figure 3:
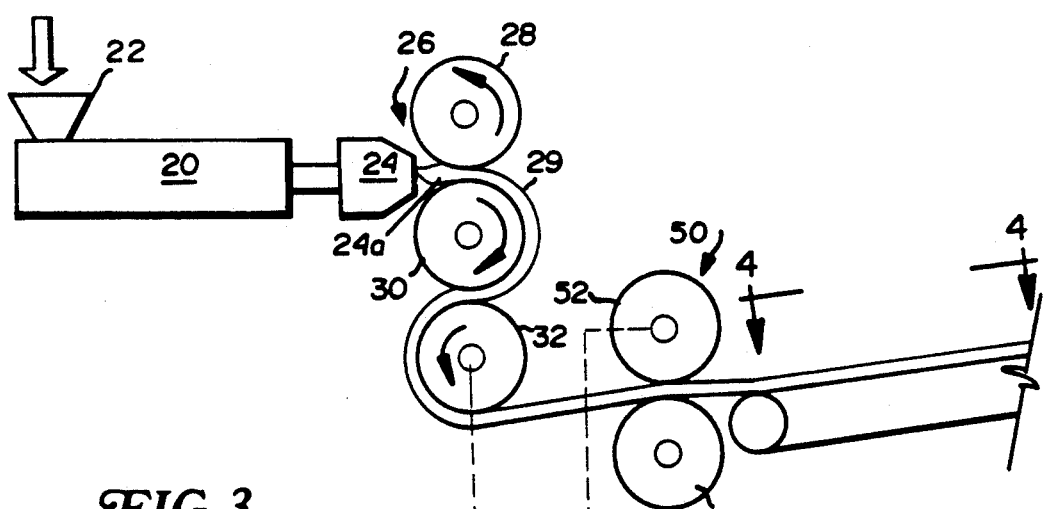
FIG. 3 is a schematic diagram showing the various processing steps employed in the present invention.

A schematic representation of a method in accordance with present invention of making the mat 10 is shown in accompanying FIG. 3. As is seen, a suitable thermoplastic material (usually in the form of pellets) is added to the screw extruder 20 via hopper 22. As is well known, extruder 20 thoroughly fluxes and heats the thermoplastic so that it is in a molten form when transferred to the extrusion die 24. The molten thermoplastic is then extruded from a slit (not shown) of predetermined dimension formed in the die 24 so that the molten thermoplastic is forced into a nip 26 defined between pattern and platen rolls 28, 30, respectively.

As will be described in more detail hereinafter, pattern roll 28 establishes a bounded region defined by a continuous pattern rib which forms the peripheral outline of the mat 10. The rib also includes contoured surfaces which conform to, and thus form, the contoured edge 18 of the resulting mat 10. That is, the outline on the pattern roll 28, when projected onto a planar surface, will correspond to the peripheral edge 18 of mat 10.

The platen roll 29 may have a smooth or textured cylindrical surface, or it may be provided with cleat-forming recesses so as to concurrently form cleats 31 extending from the bottom surface 17 of the chair mat 10 (see FIG. 2). These cleats 31, as is well known, provide a means for positionally retaining the chair mat 10 against a floor surface.

Since the thermoplastic material exiting die 24 (designated by reference number 24a) is in a molten state, it will flow laterally of the rolls under the compressive forces of the pattern and platen rolls 28. 30, at the nip 26. Thus, the established region of the pattern roll 28 will be filled with the molten thermoplastic 24a and will exit the nip 26 in the form of a sheet 29. The sheet 29 then passes around an idle roll 32 which may be supplied with a cooling medium (e g , water) so as to solidify the sheet 29. The sheet 29 then passes on to further downstream processing such as removal of the mat 10 from waste regions of the sheet 29 via cutting assembly 50 (to be described below).

As is seen in FIG. 4, a sequential number of mat "preforms" 40 is formed, each preform 40 being defined (i.e. bounded) by a tapered edge 18 yet connected to lateral waste regions 42 of sheet 29. These mat preforms 40 may then subsequently be removed thereby forming individual mats 10 by passing the sheet 29 into contact with a cutter roll assembly 50 (see FIG. 3). Cutter roll assembly 50 may be comprised of a cutter roll 52 and a pressure roll 54 which is preferably coated with an elastomeric layer. Cutter roll 52 defines a cutting edge corresponding in shape and outline to the peripheral terminal end 19 of edge 18 (see FIG. 2).

Roll 52 is rotated in synchronism, via synchronizing means 56, with the sequential passage of the mat preforms 40 so that the cutting edges on roll 52 register exactly with an outer plane passing perpendicularly through the edges 18 of mat preforms 40. The preforms 40 are thus severed from the waste regions 42 of sheet 29 along planes which are shown by chain lines 54 in FIG. 5 to thereby form the terminal end 19 of edge 18.

The synchronizing means 56 can be of any suitable type, for example, mechanical synchronizing systems employing a pulley and timing chain. Synchronizing means 56 may also be embodied in the form of a master/slave electronic and/or pneumatic control system which measures the rotation speed of roll 32 and/or rolls 28, 30 for example, and then synchronizes the rotation of roll 52 to this measured rotation speed.

The pattern and platen rolls 28, 30, respectively, are shown more clearly in accompanying FIG. 6. Pattern roll 28 includes a continuous pattern rib 60 extending about at least a portion of the pattern roll's cylindrical surface 63 so as to establish an interior region 62 bounded by the pattern rib 60 (and thus recessed relative to the upper region of the rib 60) and a lateral (i.e., outside region 62) waste region 65. As is seen, the rib 60 establishes a planar beveled surface 64 which slopes upwardly and outwardly away from the bounded interior region 62. Surface 64 thus presents a negative image of the tapered peripheral edge 18 to be formed on the mats 10. The pattern roll 28 at each end thereof includes cylindrical collars 25a and 25b which prevents inadvertent contact between the pattern rib 64 and the platen roll 30, and thus minimizes (if not eliminates) the risk of damaging the rib 64.

FIG. 7 shows the pattern roll 28 according to this invention in relationship to a planar projection thereof as shown in FIG. 8. A comparison between FIGS. 4 and 8 will reveal that the pattern rib 60 of pattern roll 28 forms a negative image of the tapered edge 18, with the pattern roll 28 itself being a negative image of the mat preforms 40 which are formed thereby.

As is perhaps more clearly seen in FIG. 8, the pattern rib 60 is comprised of a number of circumferential segments 60a (i.e., segments which conform to a cylindrical surface whose generatrices are equally radially spaced from the longitudinal axis 70 of the roll 28) and a number of longitudinal segments 60b (i.e., segments which extend parallel to the axis 70 of roll 28). Continuity of adjacent circumferential and longitudinal segments 60a and 60b, respectively, is achieved via outside and inside radii transition segments 60c and 60d, respectively. By the term "outside radius segment" is meant a segment of pattern rib 60 having a radius bend whose geometric center lies within the interior region 62 of roll 28. Conversely, by the term "inside radius segment" is meant a segment of pattern rib 60 having a radius bend whose geometric center lies within the lateral region 65 of roll 28.

As can be appreciated, predetermined combinations of circumferential, longitudinal, inside radius and outside radius segments will form desired peripheral boundaries, which in the embodiment shown in the accompanying FIGURES, just happens to be in the peripheral outline of the chair mat 10 described previously. Other peripheral outlines are of course possible without departing from the present invention. For example, a rectangular mat could be formed by providing opposing pairs of circumferential and longitudinal segments with adjacent ones being joined by means of four outside radius segments. Suffice it to say here, that the product designer can use the concepts of the present invention to provide virtually any desired peripheral outline.

Figure 9:
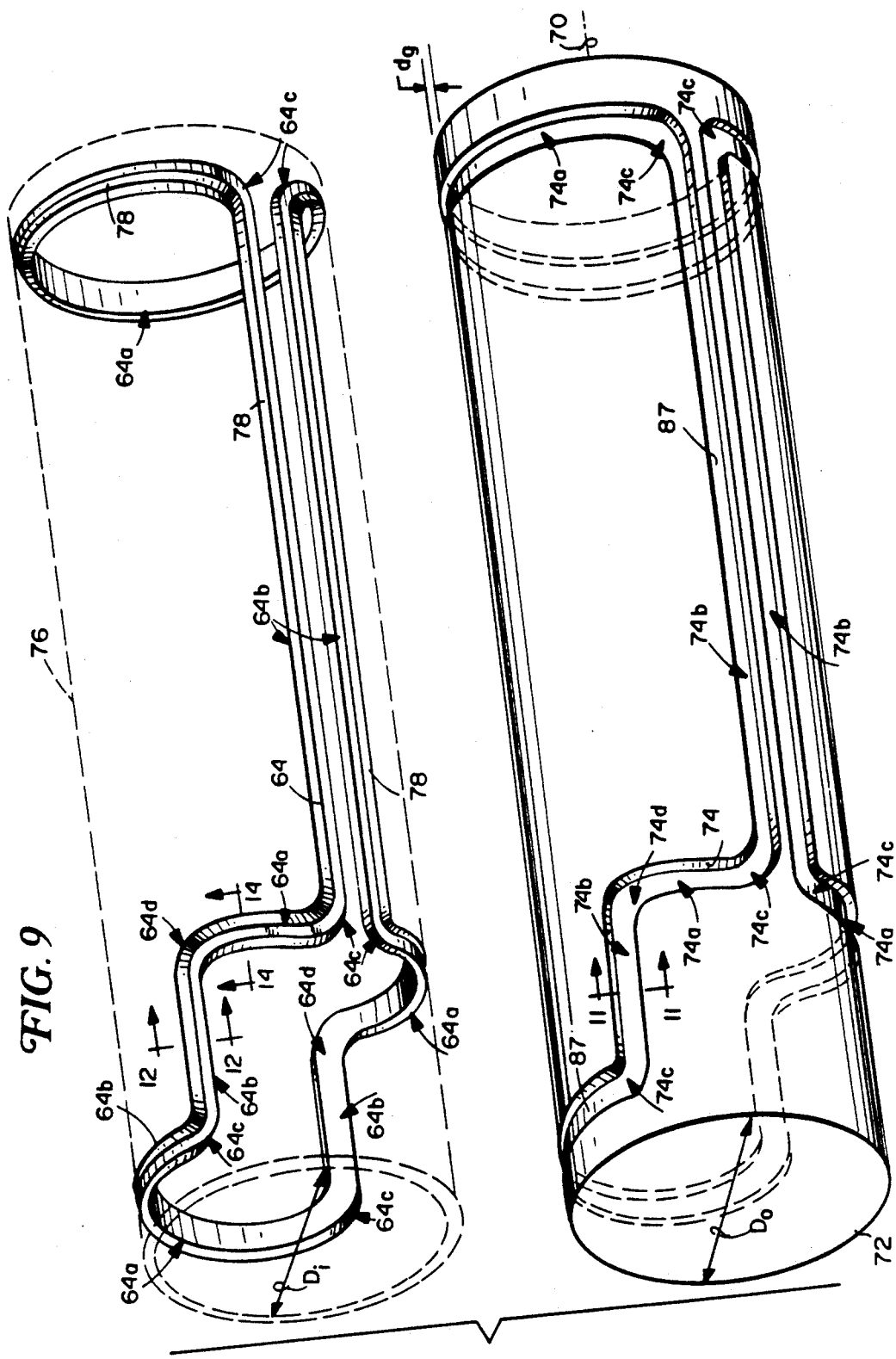
FIG. 9 is a perspective view showing the base roll and the continuous pattern rib in a disassembled condition.

Accompanying FIG. 9 shows in greater detail the pattern rib 60 and the base roll 72 in a disassembled view for ease of description—it being understood that when assembled the pattern rib 60 and the base roll 72 collectively form the pattern roll 28. The base roll 72 includes a continuous groove 74 machined into its exterior surface to a substantially constant depth dimension $d_g$. It will be observed that the groove 74 establishes circumferential and longitudinal sections 74a and 74b, respectively, continuously joined to one another by outside and inside radii sections 74c and 74d, respectively, in correspondence with the segments 64a–64d.

The groove is most conveniently formed by a conventional four (or more) axis, numerically controlled milling machine having a flat end mill. The end mill is maintained stationary while the roll is mounted on a suitable controllably movable table. Thus, under controlled movements (which may be accomplished by means of a microprocessor preprogrammed with the desired table movements), the table will present the roll 72 to the end mill so that the groove 74 may be formed.

The pattern rib 60 is, like groove 74, formed by milling using a four (or more) axis, numerically controlled milling machine by removing unwanted regions thereof (i.e., those regions not shown in solid line in FIG. 9) from a solid tubular sleeve cylinder 76 having an inside diameter $D_i$. It will be appreciated that the inside diameter $D_i$ is chosen so that it is substantially equal to the outside diameter $D_o$ of roll 72 less twice the groove depth $d_g$ (i.e., $D_i = D_o - 2d_g$).

In practice, the tubular cylinder 76 is rigidly telescopically mounted (i.e., sleeved) upon a mandrel roll (not shown) by means of suitable bolts extending through both the unwanted regions of the cylinder 76 and that region which will remain after milling (i.e., the pattern rib 60). Preferably, a number of jacking bolts connect the region of cylinder 76 which will eventually form the pattern rib 60 to the mandrel roll (not shown) so as to allow for repeated assembly and disassembly of the pattern rib 60 relative to the groove 74. Milling may then proceed by mounting the mandrel roll/cylinder 76 onto the movable table of the milling machine and then milling the interior and exterior peripheries of the pattern rib 60. Thereafter, the unwanted portions of the cylinder 76 may be removed (as by removing the bolts securing them to the mandrel roll) to thereby leave the pattern rib 60 on the mandrel roll.

After removing the unwanted portions of the cylinder 76 from the mandrel roll, a planar beveled interior edge 64 of the pattern rib 60 may then be milled, again using a four (or more) axis milling machine under preprogrammed computer numerical control. Important to the present invention is that the length of the planar beveled interior edge 64 (i.e., as measured in a plane parallel to the plane of the edge 64) is substantially equivalent to the length L of the edge 18 on mat 10 which will be formed thereby (see FIG. 2). However, as will be explained in greater detail below, it is critically important that different angular relationships exist as between the edge 19 on the circumferential and longitudinal segments 60a and 60b, respectively, and the exterior surface of the roll 74.

The pattern rib 60 in its unitary continuous configuration as shown in FIG. 9 cannot, of course, be positioned physically into the groove 74 in one piece (i.e., since the inside diameter $D_i$ of the one-piece pattern rib 60 is less than the outside diameter $D_o$ of the roll 72). Therefore it is necessary to provide a number (n) of discrete sections of pattern rib 60 which can most conveniently be accomplished by cutting through the cross-section of the pattern rib 60. Preferably, no one discrete section of pattern rib 60 will have more than one of the outside and/or inside radii segments 60c and/or 60d, respectively.

It will be appreciated that cutting through the one-piece pattern rib 60 so as to form a number (n) of sections thereof will result in the loss of material of rib 60 to the extent of the thickness (as measured in the perimetrical direction) of the rib 60. For this reason, the one-piece rib 60 is somewhat "longer" perimetrically in its as-milled condition (i.e., prior to forming discrete sections thereof) as compared to the perimetrical "length" of the groove 74. That is, the milling of the cylinder 76 is accomplished so as to compensate for the later material removal due to sectioning of the pattern rib 60. Hence, the as-milled perimetrical "length" $P_r$ of the rib 60 is greater than a corresponding perimetrical "length" $P_g$ of the groove 74 by an amount of the number (n) of sections of pattern rib 60 times the material thickness "t" removed during sectioning (i.e., $P_g = P_r - nt$). In this manner, the eventual perimetrical "length" of the pattern rib 60 sections will be substantially equivalent to the perimetrical "length" of the groove 74 when the segments are assembled therein.

FIG. 10 is a cross-sectional view of a circumferential segment 60a of pattern rib 60 as taken along line 10—10 in FIG. 8, but is also schematically representative of the longitudinal segment 60b of pattern rib 60 (except for the differential angular relationships of beveled interior edge 64 of the circumferential and longitudinal segments 60a and 60b, respectively, to be described below). As is seen, the segment 60a is seated within the groove 74 formed in roll 72 so that it projects above the interior and lateral surfaces 62 and 65, respectively, of the roll 72. It will be noted that the planar interior edge 64 of section 60a is of a length L (i.e., substantially equal to the length L of edge 18 of mat 10 to be formed thereby) and intercepts a plane tangent to interior surface 62 of roll 72 at a point 80. Thus, an uninterrupted V-shaped transition is present from the surface 62 of roll 72 to the planar beveled interior edge 64 of pattern rib 60.

Of course, the edge 64 associated with the circumferential rib segments 60a is itself circumferentially disposed about the axis 70 of roll 72—that is, the edge 64 of the circumferential segments 60a represents a conical segment. However, at any plane coincident with axis 70 passing transversely through the circumferential rib segments 60a, the edge 64 is planar in cross-sectional profile. Because of this, the edge 64 formed on the circumferential segments 60a of pattern rib 60 will, for ease of reference, be described as cross-sectionally "planar". The beveled interior edge 64 formed on the longitudinal segments 60b, on the other hand, is truly planar -that is, does not curve about the axis 70 of roll 72 but rather represents a chordal plane passing through the base roll 72. Thus, at any plane passing perpendicularly through the axis 70, the cross-sectional profile of the edge 64 formed on the longitudinal segments 60b will also be cross-sectionally planar.

The pattern rib 60 is physically secured to the roll 72 via a number of bolts one of which is shown in FIG. 10 by reference numeral 80 A rigid plug 82 is press-fitted into the rib 60 over the head of the bolt 80 so as to present a smooth upper surface 84 laterally of the cross-sectionally beveled surface 64.

FIG. 11 schematically shows the geometry of the longitudinal groove section 74b. As is seen, since the groove section 74b extends longitudinally (i.e., parallel) to the axis 70 of roll 72, the surfaces 62 and 65 will, in cross-section, appear curved. The groove depth $d_g$ of the groove section 74b will thus be measured from a line (i.e., extending out of the plane of FIG. 11 at point 83) formed by the intersection of a reference plane 84 and a longitudinal midplane 85 of the groove 74b (i.e., a plane which intersects the axis 70 of the roll 72 and laterally bisects the groove 74b) tangent to the cylindrical exterior surface of roll 72. It will be observed that the tangent plane 84 also represents the surfaces 62 and 64 of roll 72 for circumferential groove section 74a as viewed in cross-section. Thus, the groove depth dg of the groove 74 will be substantially constant as between the circumferential and longitudinal groove sections 74a and 74b, respectively.

It will also be observed in FIG. 11 that the bottom surface 87 of the groove section 74b is flat and thus establishes a plane which is parallel to the tangent reference plane 84 but separated therefrom by the groove depth $d_g$. Similarly, the bottom surface 87 of the circumferential groove section 74a will, in cross-section, appear planar and will be parallel to a plane tangent to the surfaces 62 and 65 of roll 72. However, it is to be understood that the bottom surface 87 of the circumferential groove section 74a conforms to the generatrices of a right cylinder radially spaced from the axis 70 of roll 72 by a dimension equal to the outside diameter $D_o$ of roll 72 less the groove depth $d_g$.

A schematic cross-sectional representation of a longitudinal rib segment 60b is shown in accompanying FIG. 12. As is seen the thickness $t_r$ of the longitudinal rib section 60b (as measured between the bottom surface 60b' of segment 60b and upper surface 82b) is substantially equal to the radial thickness $t_c$ of the cylindrical sleeve 76. Therefore, opposing arcuate tangs $60b_1$ and $60b_2$ are removed via milling so as to establish a planar bottom surface 60b'. Similarly, a region $60b_3$ is removed via milling so as to establish a planar upper surface 82b.

Important to the present invention, the beveled surfaces 64 associated with the circumferential and longitudinal rib segments 60a and 60b, respectively, must be differentially angularly oriented with respect to the exterior surface of roll 72 as will now be discussed with reference to FIG. 13. FIG. 13 is a composite view, for ease of understanding, showing the circumferential and longitudinal rib segments 60a and 60b, respectively, superimposed onto one another in relationship to the surfaces 62 and 65 of roll 72.

As will be observed, the intersection at point 80 of the beveled surface 64 associated with the circumferential segments 60a forms an angle $A_1$ with the tangent plane 84 (i.e., in the context of rib segment 60a, plane 84 is the same as the cross-sectional plane established by the surfaces 62 and 65). Moreover, the cross-sectional profile of the surface 64 associated with the rib segment 60a and the surface 62 of roll 72 forms an angle $A_1$ which is the same angle $A_1$ formed by the intersection of the plane of edge 18 and the top surface 16 of mat 19 (see FIG. 2).

The surface 64 associated with the longitudinal rib segments 60b, however, must intersect the tangent line 80' (i.e., a line extending out of the plane of FIG. 12 at point 80') so as to provide an uninterrupted V-shaped transition between the surface 62 of roll 72 and the beveled surface 64 of rib segments 60b. That is, since the surface 62 "falls away" from the longitudinal midplane 85 of rib segment 60b in cross-section (i.e., due to the cylindricity of surface 62), the line of intersection 80' between the surface 64 of rib segment 60b and the surface 62 will be displaced radially towards the axis 70 of roll 72 as compared to the intersection between the surface 64 of the circumferential segments 60a and the surface 62.

Therefore, it has been discovered that, in order to maintain a constant dimension L for surfaces associated with both the circumferential and longitudinal rib segments 60a and 60b. respectively, the angle $A_2$ formed by the intersection between the surface 64 associated with the rib segment 60b and the tangent plane 84 must be greater than the angle $A_1$ formed between the surface 64 associated with the circumferential rib segments 60a and a similar plane 84. It might be expected that such an angular difference between angles $A_1$ and $A_2$ would translate into a difference in the base length $L_b$ (see FIG. 2) of the tapered edge 18 about the periphery of mat 10. However, contrary to this expectation, it has been found that the base length $L_b$ is substantially constant about the mat's periphery. Moreover, this constant dimensioning of the peripheral edge 18 results in little or no distortion thereof.

Because of the angular differential as between angles $A_1$ and $A_2$ discussed above, it is also necessary according to this invention to provide a transition surface 64' for the outside and inside radii rib segments 60c and 60d, respectively. A two-dimensional representation of an outside radius segment 60c and a portion of a longitudinal rib segment 60b is shown in accompanying FIG. 14. In two dimensions, it will be observed that the line 64" of intersection with the exterior surface of roll 72 for the transition surface 64' "drops" radially towards the axis 70 of the roll 72 between intersection point 80 and intersection line 80'.

The angle formed by the surface 64' and the intersection line 64" as viewed in planes passing radially cross-sectionally through the radius segment 60c will therefore continuously gradually increase from angle $A_1$ to angle $A_2$—that is, as one views the surface 64' sequentially from radial cross-sectional planes near the terminal end of one circumferential rib segment 60a to the beginning end of a longitudinal rib segment 60b. For example, as viewed in radial cross-sectional planes passing through the segment 60c, the angle formed by transition surface 64' near intersection point 80 will be slightly larger than angle $A_1$, whereas a radial cross-sectional planes passing through the segment 60c near the intersection line 80', the formed angle will be slightly less than angle $A_2$, with gradual intermediate angles formed therebetween. In order to more easily facilitate insertion of the outside radius segments 60c, an exterior region 86 is removed about the radius bend of segments 60c as shown in FIG. 14.

FIG. 15 shows one possible cross-sectional profile which may be provided for rib 60. As is seen, the cross-section profile of rib 60 includes surface 164 (which is a negative image of the tapered edge 18 of mat 10) which slopes upwardly and outwardly away from the recessed region 62. Surface 164 terminates in a converging pair of edge-forming surfaces 166, 167 which project toward the external cylindrical surface 30a of platen roll 30 but establish a small gap of a dimension D therebetween. The edge forming surfaces 166. 167 thus establish the lateral-most extent of tapered edge 18.

Gap "D" in the continuous in-line extrusion process of the present invention permits the molten thermoplastic material to be compressed in the volumetric portion 168 (i.e. that discrete volumetric portion established at the nip 26 between the recessed region 62 surface 64 and the opposing surface 30a of platen roll 30) and flow through gap D to the lateral waste region 170 (i.e., that region established between surface portion 65 of pattern roll 28 and surface 30a of platen roll 30 in opposition therewith). Thus, gap "D" defines an escape route for excess molten thermoplastic extruded into nip 26 and compressed i.e., molten) between rolls 28 and 30. This compressive force, in turn, permits the surface 164 to in effect, mold in a continuous manner the tapered edges 18 of mat 10. However, since thermoplastic material will be present in gap D between the edge forming surfaces 166, 167 of rib 60, the mats 10 will be connected to the waste region 42—that is, the mat preforms 40 will be formed and connected to the waste regions 42 Yet will be in a condition where they can easily be removed therefrom as has been discussed above.

An alternate possible cross-sectional profile of rib 60 is shown in accompanying FIG. 16. As is seen, the profile of rib 60 shown in FIG. 16 is identical to that shown in FIG. 15 with the exception being that an extension surface 172 projects laterally of the edge forming surfaces 166, 167 (i.e. projects into the waste region 68). The projection surface 172 thus permits suitable bolts (not shown) or like securing means to pass vertically therethrough so as to insure rigid coupling between the rib 60 and the pattern roll 28.

Although reference has been made above to the formation of beveled peripheral edges on plastic products, it will be understood that such reference is merely a particularly preferred use of the pattern rolls of this invention. Suffice it to say here, that those in the art may find other beneficial uses for the pattern rolls of the present invention so as to form beveled edges on products made from a variety of materials, e.g., the shaping of metal products, leather goods, and/or other malleable materials.

Therefore, while the invention has been described in connection with what is presently considered to be the most practical and preferred embodiments, it is to be understood that the invention is not to be limited to these disclosed embodiments. Instead, the invention is intended to cover various modifications and equivalent arrangements included within the spirit and scope of the appended claims.

What is claimed is:

1. A method of forming a plastic product having first and second beveled peripheral edge portions of substantially constant geometry comprising the steps of:

(a) providing a pattern roll by:

(i) forming at least one continuous recessed groove of a depth dimension $d_g$ in a cylindrical surface of a base roll having a predetermined outside diameter $D_o$, the groove having a number of circumferentially extending sections joined to one another such that the groove formed in the cylindrical surface of the roll, when projected onto a planar surface, has a geometric configuration which establishes a peripheral outline of said plastic product;

(ii) forming, from a rigid cylindrical sleeve having an internal diameter $D_i$ less than said diameter $D_o$ of said base roll and a radial thickness $t_c$ greater than said groove depth $d_g$, a number of unitarily joined circumferential and longitudinal rib segments by removing unwanted portions of said cylindrical sleeve so that said number of unitarily joined circumferential and longitudinal rib segments remain;

(iii) forming beveled surfaces on said circumferential and longitudinal rib segments such that said beveled surfaces of said circumferential rib segments intersect a plane which is tangent to said cylindrical surface of said base roll to form an angle $A_1$, while said beveled surfaces of said longitudinal segments intersect another plane which is tangent to said cylindrical surface of said base roll at a point which laterally bisects longitudinal groove sections, so as to form an angle $A_2$ which is greater than angle $A_1$; and (iv) rigidly positioning said circumferential and longitudinal rib segments in respective circumferential and longitudinal grooved sections, whereby said first and second beveled peripheral edge portions of substantially constant geometry are formed by said circumferential and longitudinal rib segments, respectively; wherein (b) rotating said pattern roll in opposition to another roll so that the continuous edge of the pattern roll and the other roll in opposition therewith establish, at a nip therebetween, a volumetric potion of said plastic product;

(c) continuously extruding a molten thermoplastic material into the nip formed between said pattern foil and said another roll which simultaneously continuing to rotate said pattern roll in opposition to said another roll, said continuous simultaneous extrusion and rotation causing said molten material to fill completely said volumetric portion so that upon further extrusion and rotation, said plastic product having said first and second beveled peripheral edge portions is formed; and then (d) allowing said thermoplastic material to solidify.

2. A method as in claim 1, wherein an excess of molten thermoplastic material is extruded into the nip formed between said pattern and another rolls, and wherein said excess is forced laterally of said ribs.

3. A method as in claim 1, wherein a sheet establishing a number of sequential mat preforms each having first and second beveled peripheral edge portions are formed by steps (b)-(d), said mat preforms being interconnected to one another by means of a web of waste plastic material.

4. A method as in claim 3, further comprising the step of severing said mat preforms from said sheet.

5. A method as in claim 4, wherein said step of severing said mat preforms includes the steps of passing said sheet into contact with a cutting roll having a cutting edge which corresponds to said recessed and contoured edge of said mat preform in the sheet, and rotating said cutting roll in synchronism with the passage of said mat preforms in contact therewith, whereby said mat preforms are severed form the sheet.

6. A method as in claim 5, wherein said cutting roll is located downstream of said pattern and another rolls.

7. A method as in claim 4, wherein said step of severing said mat preform is accomplished by means of said pattern roll simultaneously with the formation of said mat preform in the sheet.

* * * * *